No. 751,046. PATENTED FEB. 2, 1904.
J. BIJUR.
PLATE FOR STORAGE BATTERIES.
APPLICATION FILED MAR. 31, 1902.
NO MODEL.
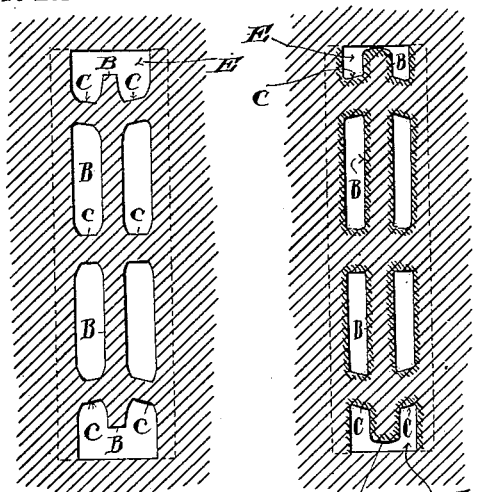
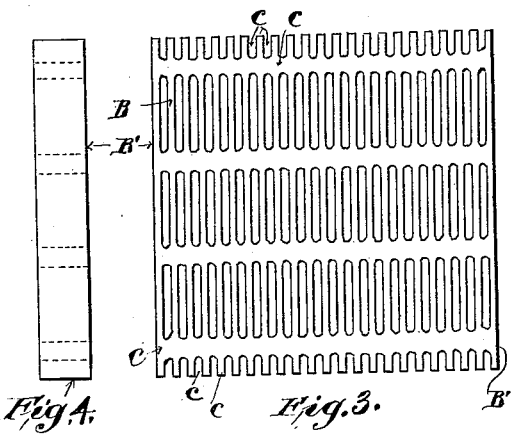
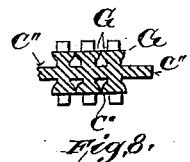
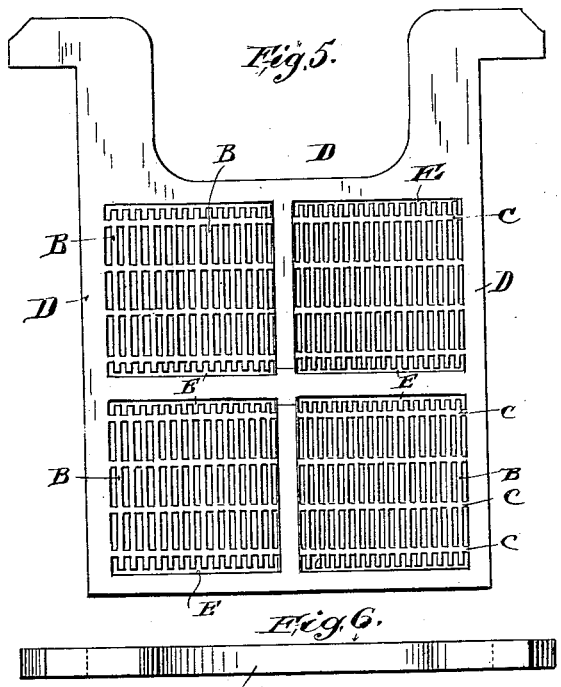
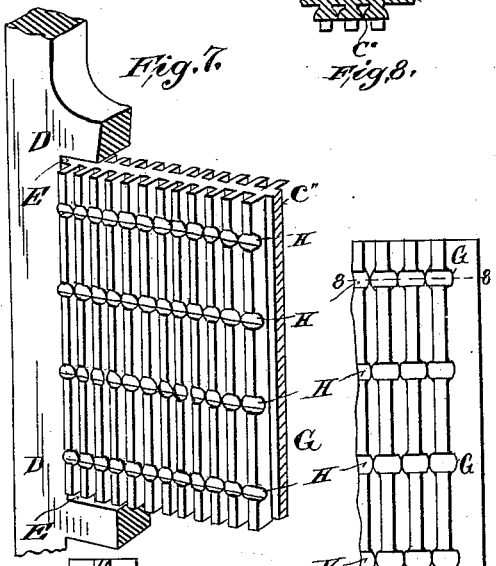
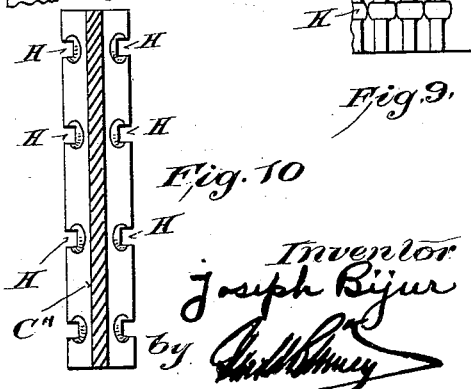

No. 751,046. Patented February 2, 1904.

UNITED STATES PATENT OFFICE.

JOSEPH BIJUR, OF NEW YORK, N. Y.

PLATE FOR STORAGE BATTERIES.

SPECIFICATION forming part of Letters Patent No. 751,046, dated February 2, 1904.

Application filed March 31, 1902. Serial No. 100,757. (No model.)

*To all whom it may concern:*

Be it known that I, JOSEPH BIJUR, electrical engineer, a citizen of the United States and a resident of the borough of Manhattan, in the city and State of New York, (post-office address 32 Nassau street, New York,) have invented certain new and useful Improvements in Plates for Storage Batteries, of which the following is a description, referring to the accompanying drawings.

The improvement relates particularly to Planté storage batteries, in which the active material is "formed" out of and upon lead portions of the electrodes by chemical or electrochemical action. The many advantages of the Planté type of plate are well recognized in this art; but so far it has not been possible to manufacture plates of this class cheaply without sacrificing some of their advantages.

The object of the present invention is to devise such a battery-plate that shall be cheap to manufacture; that shall be mechanically strong; that shall have the active material, whether spongy lead or peroxid, in very perfect mechanical and electrical contact with the plate; that shall so support and hold the active material that it cannot readily become detached and fall away; that shall have the active material so disposed that the electrolyte can circulate freely and quickly over every particle; that shall have an active surface so extensive that for a given size and capacity the active material need not be unduly thick; that shall have the proportion of inactive lead or grid as compared with the active material small without sacrificing its strength or of any of the foregoing requirements; that it may be made throughout of one integral piece when finished of lead or, better still, may have pure-lead active portions integrally or autogenously united with suitable lead antimony supporting portions of the grid, and that by reason of its design avoids undue pressure of the oxid upon the frame and of the frame upon the oxid and the consequent straining or deformation of the parts. Some of these objects may of course be accomplished without accomplishing the others; but in the preferred form of my battery-plate I believe all these objects have been accomplished in a manner at once economical and simple.

I have already in my application Serial No. 26,852 set forth a process for making autogenously-united battery-plates by which very minutely divided strips, shelves, or shreds of lead may be united with lead or lead-antimony supports, and my other pending applications cover some forms of battery-plates produced by such a process.

The present invention is not limited to any particular process of producing the plate, though I know of no process that will produce it as effectively and economically as the process which I myself have devised. The present improvement having relation to the plate or article itself without regard to the manner of its production, is illustrated in one form in the accompanying drawings.

Figure 1 is an enlarged schematic section showing one principle by which I prefer to support the portions adapted to become active. Fig. 2 shows the same section after it has been formed and the surface rendered active. Fig. 3 is a face view, and Fig. 4 an edge view, of one of the grilles or portions adapted to become active in the form in which I prefer to embody them. Fig. 5 is a face view, and Fig. 6 a plan view, of one form of improved battery-plate. Fig. 7 shows in detail a modification in less approved form of the invention. Figs. 8, 9, and 10 are horizontal section, face elevation, and vertical section of a portion of one of the panels, grilles, or active elements of the same form as in Fig. 7.

In Fig. 1, B is a single elementary unit or strip of lead adapted to become active and supported at intervals on either side by the cross members C. In Fig. 2 the same parts are shown after the strip B has been formed. The active layer is indicated by the darker cross-hatching. It will be noticed that the horizontal surfaces near the top and bottom of Fig. 2 are not shown with a layer of active material. Such a condition would occur when these portions of the plate were of lead-antimony alloy that was not attacked by the electrolyte in the formative process. The dotted lines in Figs. 1 and 2 show the preferred boundary-line between the lead portions adapted to become active and the antimony-lead portions not adapted to become active. In the broader aspect of my invention the whole plate, however, may be made of lead at a single casting by means of removable cores forming the small open intervals or cells of the plate. The object of mounting the strip B with a free interval at each side and at each end of the strip is to permit it to elongate and to thicken without the plate buckling and without giving rise to any trouble during the formative process or during the charging and discharging the battery in use. Fig. 2 shows exaggeratedly the strip B after elongation, the cross members C having yielded to the strain. Such cross-supports in practice are sufficiently flexible for this purpose, as the elongation is not so great as to break them. Another feature of my improvement consists in the widening and reinforcing of the strips in the immediate vicinity of their juncture with the cross-supports C. In other words, the ends of the cells are narrowed or tapered slightly. The object of this is to lessen or compensate for the stretching and distortion of the parts at this point by the formation and crowding of active material in the angular recess at the junction of the strip and its support. It serves the further object of mechanically strengthening the juncture against the stresses produced in it by the elongation of the strip B and the deformation of the transverse support C to accommodate the elongated movement, as seen in Fig. 2. In Figs. 3 and 4 my present preferred embodiment of these elementary strips into a panel, grille, or active portion of more suitable extent is shown. A large number of strips B are united by several cross members or cross-strips C. When such a panel or grille is united integrally or autogenously to the ribs or supports D of the battery-plate, as shown in Fig. 5, the entire outer surfaces of the outside strips B' are preferably merged into and united with the metal of the ribs D— as, for example, is indicated in the schematic views, Figs. 1 and 2, by the dotted lines. I prefer to cast the several panels or grilles separately from the rest of the battery-plate and to cast the grilles under pressure in a mold having withdrawing cores forming the cells between the strips B; but, of course, the method of formation is not a part of the present invention. After the panel has been cast and is ready to be cast into the supports of the plate it is placed in a suitable mold and the supports cast onto it. In order to make intervals E at the ends of the strips, a suitable core may be employed, as is understood in the art of casting such articles. Preferably the process set forth in my application above referred to should be resorted to. By whatever process the plate is made so long as the several parts in the finished plate are integrally united mechanically and electrically the resulting plate will be characterized by a large active area, great strength, freedom of the active strips to elongate without causing strains or buckling the frame, and freedom of circulation of the electrolyte and of the gases formed in the operation of the battery, in addition to other advantages, some of which are pointed out above and others of which will be readily seen by those skilled in the art.

In the modified form (shown in Figs. 7 to 10) the strips $b''$ are united to their immediate supports $c''$ throughout their entire length, leaving such strips or active members $b''$ far less freedom to expand lengthwise. The same interval $e$ is, however, provided between the ribs or supports D of the plate and the extreme ends of the members or strips $b''$ to afford space for the elongation of the strips. As this form of the invention does not have cells surrounding the active material on all sides in the same sense as in Figs. 1 to 6, I prefer to provide projecting ears or lugs $g$ on the strips $b''$, which may best be formed by crushing down the edges of the strips by a bar or narrow instrument, so as to force out the lead laterally and produce the lugs $g$. These lugs $g$ help to confine the active material between neighboring strips $b''$. The imprint of the bar which forms a groove or channel across the strips is shown at $h$. Such a form of active element or panel is a very cheap construction.

Obviously some features of my invention may be used without others and may be embodied in widely-varying forms. For this reason I claim as my invention the following:

1. A battery-plate provided with active portions having one or more grilles embodying strips extending in one general direction and cross members supporting such strips, the spaces between strips being narrower at their ends, where the strips join the cross members, whereby the junctures between strips and cross members are strengthened, and the destructive crowding effect of the layer of active material diminished.

2. A Planté battery-plate, having a frame provided with ribs, and active members in the form of unit-strips supported at a plurality of points by cross-supports secured to the ribs, said strips being free to move at their extreme ends, said frame having intervals opposite the ends to receive said ends and afford provision for the elongation of the strips, for substantially the purposes set forth.

3. A Planté battery-plate, having a frame provided with ribs, and active members in the form of long and narrow unit-strips supported at a plurality of points in their length by cross-supports secured to the ribs, said strips being free to move at their extreme ends, said frame having intervals opposite the ends of the strips to receive said ends and afford provision for the elongation of the strips in the direction of their length, for substantially the purposes set forth.

4. A Planté battery-plate, having a frame provided with ribs, and active portions provided with active members in the form of unit-strips yieldingly supported at each side from the ribs by cross-supports, and free to move longitudinally in lengthening and also free to expand in their several thicknesses, for substantially the purposes set forth.

5. A Planté battery-plate, provided with active portions having one or more grilles embodying strips extending in one general direction and free to move at each end, and transverse cross-supports uniting and supporting the strips at a plurality of points, such parts being one integral whole and permitting elongation of the said strips, and being autogenously or integrally united to the frame or supports of the plate, for substantially the purposes set forth.

6. A Planté battery-plate, provided with active portions having one or more grilles embodying strips extending in one general direction and free to move at each end, and transverse cross-supports uniting and supporting the strips at a plurality of points, such parts being one integral whole and permitting elongation of the said strips, in combination with a lead-alloy frame or support which is integrally united to the said grilles, for substantially the purposes set forth.

7. A Planté battery-plate, provided with active portions having one or more grilles embodying strips and cross-supports, said grilles being held and surrounded by the battery-plate ribs or supports in a manner leaving intervals at the ends of the strips, for permitting the elongation of the strips, and the cross-supports being of sufficient yielding design to accommodate the elongating movement, for substantially the purposes set forth.

8. A Planté plate, comprising an outer frame and ribs lying within the sides and ends of the frame, the frame and ribs forming a flat supporting structure, and active members in the form of unit-strips, having their sides supported by said structure and lying with their longest dimensions substantially within the plane of the plate, the ends of said strips being free to move with intervals between said ends and the supporting structure to afford provision for longitudinal elongation of the strips, for substantially the purposes set forth.

9. A Planté plate, comprising an outer frame and ribs lying within the sides and ends of the frame, the frame and ribs forming a flat supporting structure, and active members in the form of unit-strips autogenously or integrally united to the supporting structure at their sides, and lying with their longest dimensions substantially within the plane of the plate, the ends of said strips being free to move with intervals between said ends and the supporting structure to afford provision for the longitudinal elongation of the strips, for substantially the purposes set forth.

10. A Planté plate, comprising an outer lead-alloy frame and ribs lying within the sides and ends of the frame, the frame and ribs forming a flat supporting structure, and active portions comprising grilles embodying strips extending in one general direction and having their sides supported by said structure, and lying with their longest dimensions substantially within the plane of the plate, the ends of said strips being free to move with intervals between said ends and the supporting structure to afford provision for the longitudinal elongation of the strips, for substantially the purposes set forth.

Signed this 17th day of March, 1902.

JOSEPH BIJUR.

Witnesses:
E. VAN ZANDT,
HAROLD BIRNEY.